United States Patent [19]
Leeson

[11] Patent Number: 5,111,653
[45] Date of Patent: May 12, 1992

[54] FUEL DELIVERY SYSTEM WITH CAPACITY MONITOR

[75] Inventor: Plato J. Leeson, Rockford, Ill.

[73] Assignee: Woodward Governor Company, Rockford, Ill.

[21] Appl. No.: 508,241

[22] Filed: Apr. 11, 1990

[51] Int. Cl.$^5$ ................................................. F02C 7/22
[52] U.S. Cl. ................. 60/39.02; 60/39.091; 60/734
[58] Field of Search ............. 60/39.02, 39.141, 39.091, 60/39.281, 734, 243; 364/431.02

[56] References Cited

U.S. PATENT DOCUMENTS

| | | | |
|---|---|---|---|
| 3,142,154 | 7/1964 | Leeson | 60/39.281 |
| 3,287,965 | 11/1966 | Brahm et al. | 364/431.02 |
| 3,750,465 | 8/1973 | Howell et al. | 364/431.02 |
| 3,927,307 | 12/1975 | Reschak | 364/431.02 |
| 4,458,713 | 7/1984 | Wernberg | 137/117 |
| 4,716,723 | 1/1988 | Ralston et al. | 60/39 |

Primary Examiner—Louis J. Casaregola
Attorney, Agent, or Firm—Leydig, Voit & Mayer

[57] ABSTRACT

A fuel delivery system for an aircraft gas turbine engine which provides a monitor intended to estimate, from actual engine starting or operating conditions, whether the fuel delivery system is capable of meeting predetermined operating specifications, such as adequate capacity for a windmill restart. The differential pressure regulating valve, which is normally provided to maintain a constant pressure drop across the metering valve which meters fuel to the jet turbine engine, has a position monitor associated therewith. A signal relating to the regulating valve position is processed along with a signal indicating the corresponding actual engine operating conditions, to determine "excess capacity" at the operating condition and estimate from the information whether the engine will likely be capable of meeting worst case demands.

26 Claims, 4 Drawing Sheets

FUEL DELIVERY SYSTEM WITH CAPACITY MONITOR

FIELD OF THE INVENTION

This invention relates to fuel delivery systems for aircraft gas turbine engines, and more particularly to monitoring systems associated with such fuel delivery systems.

BACKGROUND OF THE INVENTION

Fuel delivery systems for gas turbine engines in aircraft applications must be robust in the sense that they require high reliability and reasonably precise control, while satisfying a wide range of operating demands. The systems usually include a pump which takes fuel from a supply or sump to produce a high pressure fuel source, and various flow control components operational in the high pressure fuel circuit. Such systems are usually of fairly high mechanical complexity. A degree of leakage in the various components (between the high and low pressure sides) is virtually inherent, but within certain limits leakage can be tolerated so long as the system is able to supply adequate capacity to meet the worst case system demand. Typical prior art fuel delivery systems for use with gas turbine aircraft engine systems are shown in U.S. Pat. Nos. 3,142,154, 4,458,713 and 4,716,723, each assigned to the assignee of the present invention.

The primary purpose of the high pressure fuel delivery system is to supply high pressure fuel through a metering valve to the gas turbine engines which power the aircraft. In addition, the high pressure fuel system is often utilized as a source of high pressure fluid for the hydraulic systems which position actuators which control the engine or other aspects of the aircraft. It can thus be appreciated that the system must maintain an adequately high pressure in all circumstances, and also be capable of providing flow rates to meet the most stringent demands. Considering those requirements in the context of a relatively mechanically complex system which can tolerate a degree of internal leakage, it will be appreciated that it is difficult to predict, with any degree of certainty, the operational point at which the system as a whole will likely be incapable of meeting worst case operating demands. And since worst case operating demands are seldom encountered in actual practice, and an inadequate system will typically be capable of meeting normal operating demands, the difficulty in isolating a potentially inadequate system for repair or replacement will be apparent.

In order to adequately control fuel delivery rate to the engine by means of a metering valve, a regulating valve is provided for maintaining a substantially constant pressure across the metering valve. In normal operation such as in cruising at high altitude, the fuel demands of the engine are a relatively small fraction of the delivery capacity of the fuel system. The regulating valves in most systems serve to divert a portion of the flow from the engine metering branch in light fuel demand conditions. For example, a number of regulating valves are configured as bypass valves which simply bypass large quantities of the high pressure fuel back to the sump. While such bypassing is inefficient and tends to heat the fuel unnecessarily, it represents a practical way of dealing with the excess flow capacity in normal operating circumstances, while still assuring that capacity is present to meet stringent or worst case demands.

A particularly stringent requirement is aircraft engine starting or restarting. Even more important than starting an engine on the ground is the windmill restart of an engine on an airplane in flight. Assuming a worst case condition where the aircraft has lost power from all engines, one of the engines must be restarted while the airplane is gliding. The engine compressor and turbine blades are at that point simply "windmilling" by virtue of the air passing through the engine of the gliding aircraft. Since the fuel pump which creates the high pressure fuel supply is coupled to the engine, it will be operating at a much lower rotational speed than when the engine is normally running. Thus, the fuel system delivery capacity at starting or windmill RPM must be adequate to supply enough fuel to the engine to start it reliably. The fact that an engine has started on the ground is some indication of system operability, but even then, it is not known how borderline the fuel delivery system might be.

When the fuel delivery system of an aircraft engine is new, its delivery capacity (and therefore its excess capacity) has been measured. As the system ages, however, the pump may become less efficient, passages may become restricted, seal leakage can increase, and in effect the maximum or average pumping capacity is not easily determined. It was pointed out above that the delivery capacity, particularly at low engine RPM, can become a critical factor. Since the aircraft operator does not know what the delivery system capacity is at any given point in its life, he is faced with two options, neither of which is completely satisfactory. The aircraft operator can simply continue to operate the equipment until it becomes difficult to start or fails to start on the ground, and use that as a measure of an obviously inadequate system. Alternatively, the delivery system can be replaced at periodic intervals somehow related to expected system wear. The former alternative can result in too great a delay before replacing the equipment, and the latter is deficient in failing to adequately take into consideration the actual condition of the equipment.

SUMMARY OF THE INVENTION

In view of the foregoing, it is a general aim of the present invention to provide a monitoring system for an aircraft fuel delivery system, the monitoring system being adapted to signal fuel delivery system degradation below a predetermined acceptable level.

In that regard, it is an object of the present invention to associate a monitoring system with a conventional fuel delivery system, the monitoring system interposing little additional complexity into the system, but providing a measure of the fuel system delivery capacity which can be interpreted to estimate the ability to meet predetermined operating specifications.

An object of the invention is to monitor the condition of one of the flow components in a high pressure fuel system which is indicative of system delivery capacity, and estimate from the delivery capacity at actual operating conditions whether the system is capable of meeting specified minimum delivery rates.

According to one aspect of the invention, it is an object to monitor the fuel delivery system for an aircraft operating in normal conditions, and estimate from the operating characteristics of the delivery system whether it is capable of providing flow rates to meet engine starting requirements.

In practicing the invention, there is provided a gas turbine aircraft engine fuel delivery system with capacity monitor. The system includes a fuel supply having a pump for creating a high pressure fuel source and a metering valve for metering the high pressure fuel supply to the engine. A regulating valve serves to maintain the pressure drop across the metering valve at a substantially constant level. Indicator means are provided for producing a first signal related to the position of the regulating valve. Means are also provided for producing a second signal relating to an important engine characteristic, such as engine operating RPM. Control circuit means responds to the first and second signals to estimate the capacity of the fuel delivery system to meet predetermined operating specifications from the position of the regulating valve and the actual operating conditions of the engine for that position.

In practicing the preferred embodiment of the invention, the preferred operating specifications relate to the ability of the fuel delivery system to meet worst case engine operating demands. As a result, the predetermined operating specifications are different from, and in most cases more stringent than, the conditions at which the engine was operating at the time the first and second signals were produced. Thus, it is a feature of the invention that the fuel delivery system is monitored at normal engine operating conditions to provide an estimate of the ability of the fuel delivery system to meet specifications at conditions other than those at which the engine is operating. The invention thus provides the ability to estimate whether the fuel delivery system will be capable of meeting worst case demands, such as a windmill start, without actually having to operate the fuel delivery system under those conditions.

It is a feature of the invention that the fuel delivery capacity of the engine is monitored at normal operating conditions in order to provide an indication of whether the engine will be capable of meeting worst case demands. A further feature of the invention is the monitoring of an existing fuel system component, preferably the position of the regulating valve, to derive an indication of excess fuel delivery capacity at a given operating condition in order to predict whether the fuel delivery system will be capable of meeting worst case demands.

In the currently preferred practice of the invention, the position of the regulator valve is monitored during engine starting. The point at which the regulator valve initially moves from a first quiescent position is detected. Such point can be the initial movement of the regulator valve, the point at which the regulator valve cracks, or some other fixed point normally associated with initial starting of the engine. In any event, that first detection of the regulator valve passing through that position is noted, and the engine RPM sensed at that time. The control system then utilizes that point of initial regulator valve movement along with the corresponding engine rpm which created that movement to make a determination as to the excess capacity of the fuel delivery system.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
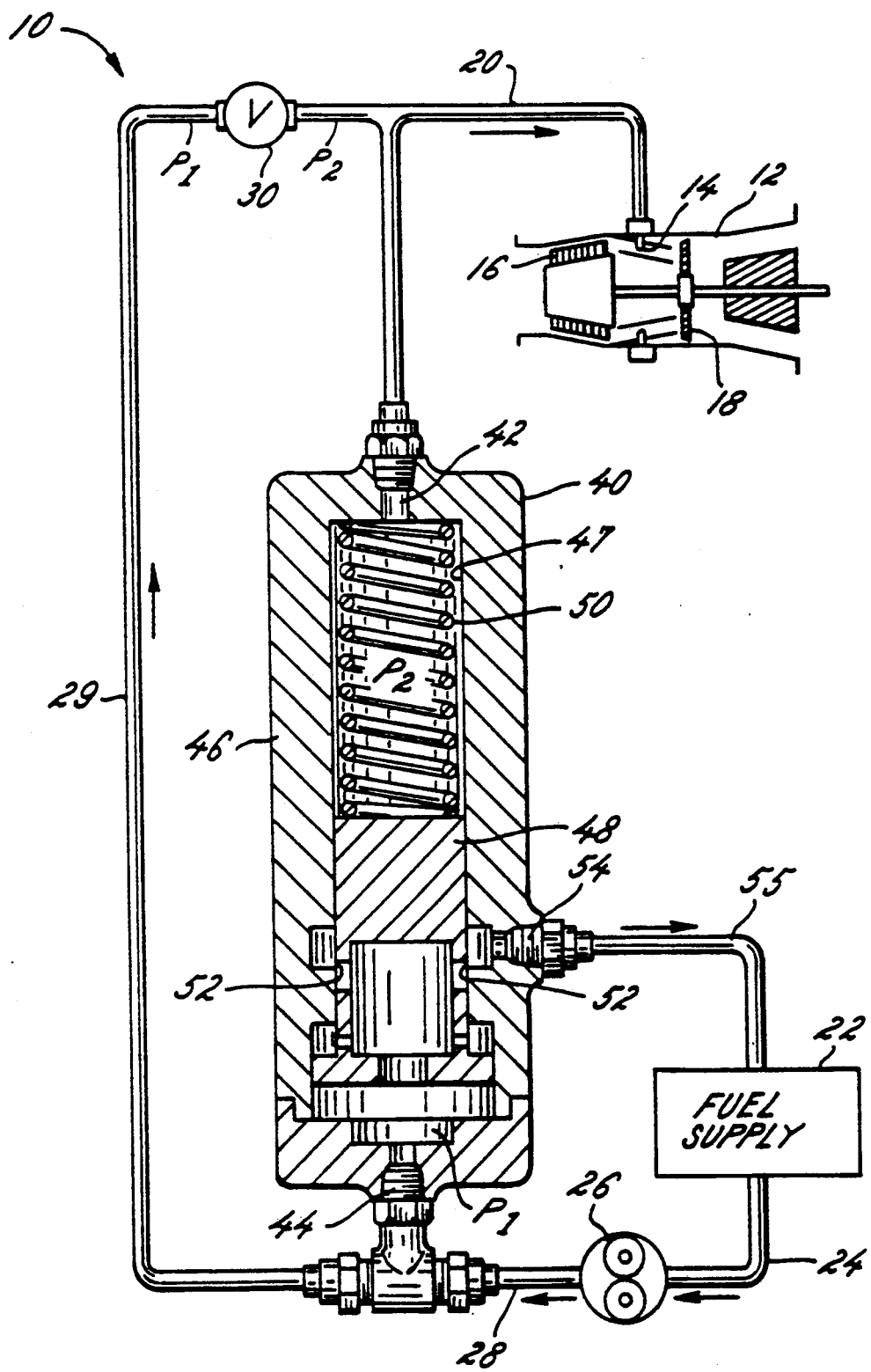
FIG. 1 is a schematic view of a conventional fuel delivery system for a gas turbine aircraft engine, which can be associated with a monitoring system according to the present invention.

Turning now to the drawings, FIG. 1 shows a prior art fuel delivery system for an aircraft jet turbine engine as more fully described in Wernberg U.S. Pat. No. 4,458,713. FIG. 1 was taken from the aforementioned U.S. patent and in the context of that patent it was intended to emphasize the details of the regulating valve. It thus illustrates the regulating valve in substantially larger proportion than the rest of the system elements. Those skilled in the art will appreciate, however, that FIG. 1 illustrates a fuel delivery system 10 adapted to supply high pressure fuel to a gas turbine aircraft engine generally indicated at 12. The engine 12 is schematically illustrated as including a combustion chamber 14 intermediate a compressor section 16 and a turbine blade 18. The fuel delivery system 10 is adapted to supply fuel to the combustion chamber 14 by means of a high pressure inlet 20. The fuel supply is schematically illustrated at 22, and includes not only the fuel tanks themselves, but also, in most cases, a low pressure booster pump. The fuel supply is connected by a fuel line 24 to the inlet of a high pressure pump 26. The pump 26 is preferably a positive displacement pump such as the illustrated gear pump, but as will be described below, need not be. In either case, the high pressure pump 26 has an outlet conduit 28 which serves as a high pressure fuel source. Such source is coupled by an inlet 29 to metering valve 30 which meters fuel to the combustion chamber 14 of the engine 12.

As is well known, the metering valve 30 serves as the main fuel control to the engine, and in order for valve position to accurately relate to fuel flow to the engine, it is typical to provide a differential pressure regulating valve for controlling the pressure drop across the metering valve to a substantially constant level. FIG. 1 illustrates the metering valve 30 as having high pressure $P_1$ at its inlet and a lower pressure $P_2$ at the outlet, and the differential pressure $P_1-P_2$ across the metering valve is sometimes referred to as $\Delta P$. Coupled across the metering valve 30 is a regulating valve 40 having a first inlet 42 coupled to the metering valve outlet, and a second inlet 44 coupled to the high pressure source 29. Thus, the regulating valve 40 has its opposite inputs connected across the metering valve 30 and is in a position to sense the pressure differential $\Delta P$ across the metering valve. The function of the regulating valve is to sense changes in $\Delta P$ and make adjustments in the fuel delivery system 10 intended to keep $\Delta P$ at a substantially constant level.

It is noted that in the system of FIG. 1 the regulating valve is both sensor and actuator in that it both senses $\Delta P$ and makes the necessary adjustments to maintain $\Delta P$ at a substantially constant level. Those skilled in this art will appreciate that other systems are available such as an integrating $\Delta P$ regulator which employs a pilot valve to integrate $\Delta P$ changes and control a regulating valve which maintains constant $\Delta P$. Thus, the important characteristic insofar as the present invention is concerned is the fact that the regulating valve is the element which controls the $\Delta P$, irrespective of whether additional apparatus is utilized in the sensing function.

In the system of FIG. 1, the differential pressure regulating valve 40 includes a housing 46 having a bore 47 in which is mounted a reciprocatable piston member or spool 48 adapted to sense the differential pressure [$\Delta P$] and open or close a bypass port 52 in dependence on $\Delta P$. It is seen that the piston member 48 is biased downwardly by means of a spring 50. The low pressure $P_2$ port 42 is open to the upper surface of the piston and the high pressure $P_1$ port 44 is open to the lower surface of the piston such that changes in $\Delta P$ cause the piston member 48 to be repositioned within the cylindrical bore 47. It is seen that ports 52 in the piston member 48 serve to control the degree of opening between the high pressure $P_1$ inlet 44 and a bypass outlet 54. The bypass outlet 54 in turn is coupled by means of a bypass line 55 to the fuel supply 22. Thus, with the system operating at an equilibrium condition, the spool 48 will adjust the bypass to achieve the desired $\Delta P$ across the metering valve 30, and as a result will cause a quantity of the high pressure fuel output by pump 26 to be bypassed to the supply 22. Assuming that the regulating valve 30 is then further closed, the differential pressure $P_1-P_2$ across the metering valve 30 will increase. That increase in $\Delta P$ will be sensed in the regulating valve 40 and cause the piston member 48 to rise, further opening the bypass port 52, increasing the quantity of fluid diverted to the bypass line 55 and ultimately returning $\Delta P$ to the quiescent level. Similarly, if the metering valve 30 is further opened, $\Delta P$ across the metering valve will decrease, and the increase in $P_2$ with respect to $P_1$ will drive the piston 48 downwardly, further closing port 52, reducing the quantity of fluid diverted to the bypass line 55, and returning $\Delta P$ to its designed level. It will thus be appreciated that the position of the regulating valve 48 is a measure of bypass fluid flow in the illustrated system for the engine operating conditions then in existence. According to the invention, use is made of the fact that the quantity of bypass fluid can be related to excess fuel delivery capacity, if the engine operating conditions are known under which the valve position or bypass fluid volume is measured.

In accordance with the invention, a high pressure fuel delivery system such as that illustrated in FIG. 1 is provided with means for monitoring the condition of the regulating valve and producing a first signal indicative of regulating valve condition. Such monitoring means are associated with a second signal representative of the operating condition of the engine 12 under which the first signal was produced. Those signals are processed to estimate the capacity of the fuel delivery system to meet predetermined operating specifications. In practicing the invention according to a certain preferred mode, the indication of regulating valve position and the associated operating conditions of the engine are taken during a known operating condition, and the position of the regulating valve interpreted in view of that known operating condition to provide an indication of fuel delivery system "excess" capacity, and that excess capacity interpreted to make an assessment of whether the fuel delivery system is capable of delivering the fuel flow rates necessary to meet worst case engine operating demands.

Figure 2:
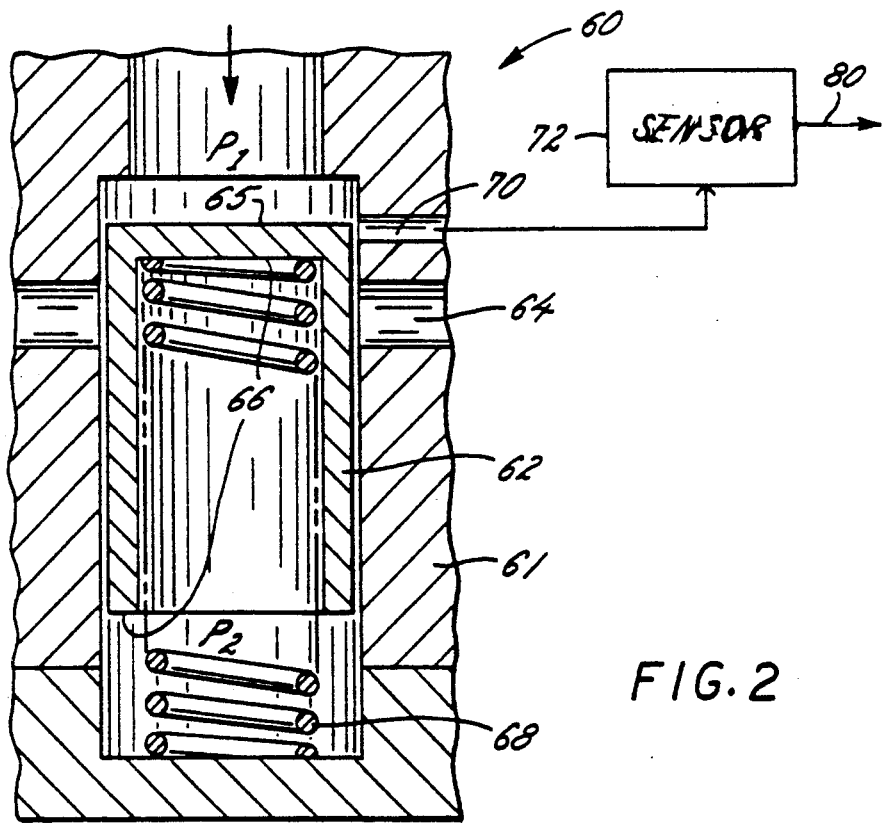
FIG. 2 is a diagrammatic view of a portion of a bypass valve of the system of FIG. 1 configured with a monitoring system and exemplifying the present invention.
Figure 3:
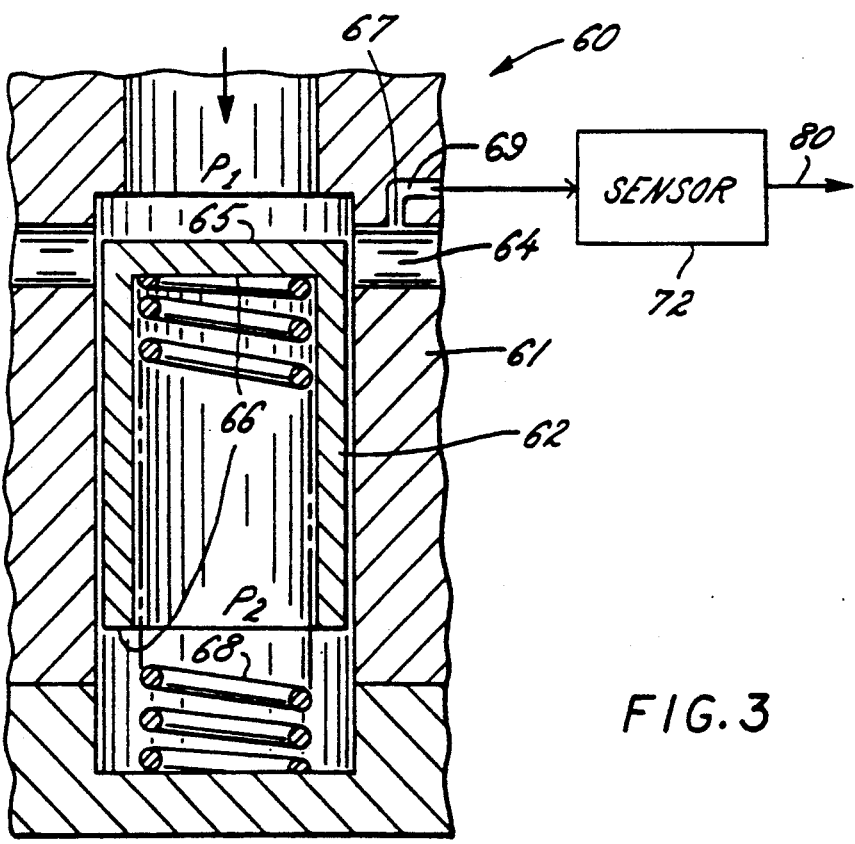
FIGS. 3 and 4 are diagrammatic views like FIG. 2 illustrating additional embodiments of the present invention.
Figure 4:
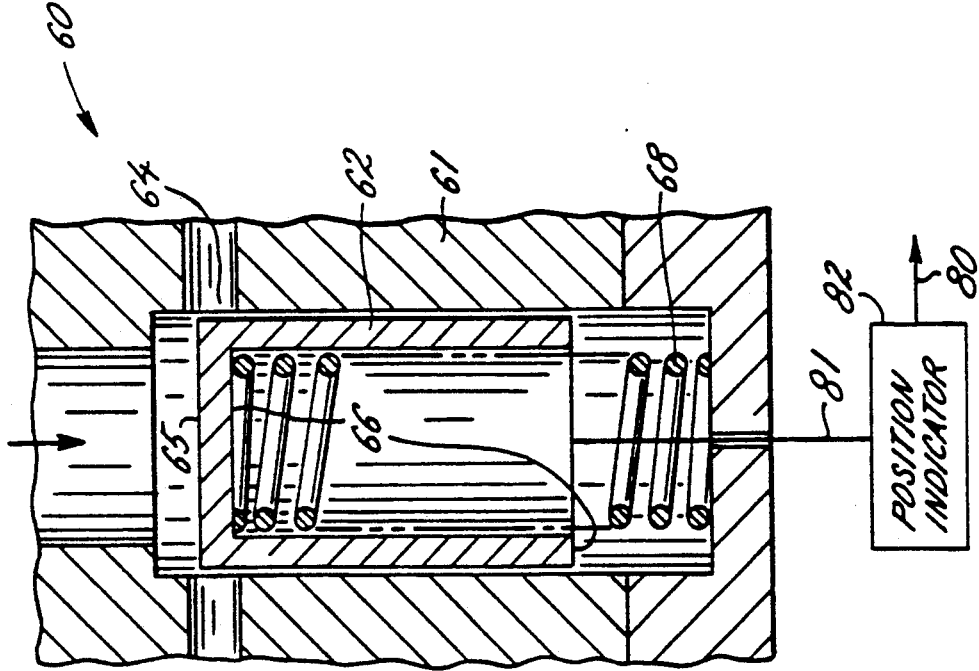

The invention is best understood with reference to FIGS. 2-4 which illustrate a portion of the fuel delivery system of FIG. 1, more particularly a modified form of regulator valve 60 adapted to provide a signal or indication of the position of the regulator valve which in turn, when correlated with the engine operating conditions, is an indicator of the fuel system delivery capacity. Thus, turning to FIG. 2, there is shown, partly in schematic, a portion of regulating valve 60 including valve piston or spool 62 mounted for reciprocation in valve body 61, and adapted to control the degree of opening of bypass port 64. As in the system of FIG. 1, high pressure from the supply $P_1$ appears at a first face 65 of piston 62 whereas lower pressure $P_2$ (taken from the discharge end of the metering valve) appears at the second face 66 of the piston. Those opposed pressures, in combination with a bias force provided by spring 68, establish the position of the piston 62 and thereby the degree of opening of the bypass port 64. In the illustrated condition, the bypass port is completely closed; such a condition is found in some systems with the engine operating at low RPM such as below start. In practicing the invention, the bypass valve 60 is modified to include indicator means indicative of valve position, in the illustrated embodiment a hydraulic indicator means in the form of signal port 70. In its simplest form, the signal port 70 provides a simple signal indicating that the regulating piston has moved past the position defined by the signal port. In an alternate embodiment, hydraulic conditions in the port 70 can be sensed to provide a more continuous measure of regulating valve position. In either event, a hydraulic sensor 72 is coupled to the port 70 to provide a signal on output line 80 which is indicative of piston position. If the hydraulic system is relatively new with little leakage and has the potential for substantial excess capacity, even at very low RPM the piston 62 will have the signal port 70 comparatively open, to produce a signal on line 80 indicating such excess capacity. However, in an older system with increased leakage or reduced efficiency, the pressure $P_1$ will be somewhat lower, forcing the piston 62 further upward, keeping the signal port 70 closed until a higher RPM level is reached.

It is noted that the system of FIG. 2 preferably operates at low RPM in which the fuel pump 26 (FIG. 1) is turning at a comparatively lower rate. In other systems where it is desired to measure system delivery capacity at higher RPM, or in systems where the bypass valve is bypassing fluid even at very low RPM, the signal port 70 is preferably shaped and configured to provide a hydraulic signal either in the form of a pressure or a flow rate which is indicative of valve position. The many ways in which such a valve can be configured will be apparent from this description in conjunction with the schematic illustration of FIG. 2.

Turning now to FIG. 3, there is shown a system similar to FIG. 2, but different in the sense that the hydraulic signal indicative of regulating valve position is best measured with the bypass port partly open. FIG.

3 shows a valve body 61 with internal valve spool 62 controlling the degree of opening of bypass port 64. A shaped bypass port orifice 67 is coupled to the bypass port 64. Associated with the bypass port orifice 67 is a signal port 69 which is adapted to sense the flow rate through the bypass port 64 and thereby provide a hydraulic signal relating to the degree of opening of the regulating valve. When the regulating valve of the FIG. 3 embodiment is opened to a greater extent than shown in FIG. 3, flow through the bypass port 64 is greater and the hydraulic signal in the signal port 69 will so indicate. Similarly, when the regulating valve is further closed, the reduced flow through the bypass port 64 will be sensed in the signal port 69 to produce a corresponding hydraulic signal. As in the case of FIG. 2, the hydraulic signal is transformed in a sensor 72, preferably to produce an electrical signal on output line 80 which is coupled to a control system to be described below. As will be described in connection with FIG. 5, the control system determines the excess capacity of the fuel delivery system based on the position of the bypass valve and the operating condition of the engine for that valve position, to estimate whether the engine will be capable of meeting worst case demands.

A further embodiment of a regulating valve which produces a signal relating to bypass valve position is shown in FIG. 4. FIG. 4, like FIGS. 2 and 3, shows a regulating valve 60 having a valve spool 62 controlling the degree of opening of a bypass port 64. In contrast to the FIG. 2 and 3 embodiments, there is no hydraulic passage for producing a hydraulic signal relating to the position of valve member 62. Instead, an electrical position indicator 82 is provided which has a linkage schematically illustrated at 81 coupled to the piston 62. The position indicator 82 thereby provides an electrical indication on an output line 80 which is a measure of the position of valve 62 and thereby the degree of opening of the bypass passage 64. In the preferred practice of the invention, the position indicator 82 produces an electrical output signal on output line 80 which is coupled to the control circuit of FIG. 5.

In each of the foregoing embodiments, it was described how the position of the valve member in the regulating valve was monitored to produce an indication of valve position. It will be appreciated that such monitoring can be by the electrical or hydraulic means illustrated in FIGS. 2-4, or by other mechanical means, such as, for example, by a flowmeter transducer coupled in the bypass passage. Irrespective of the transducer type, for ease of signal processing, it is preferable to produce an electrical output signal from the transducer for further processing. As will now be clear, the electrical signal can take various forms. In one embodiment, it can be a digital type signal which simply indicates that the regulating valve has reached a predetermined position or moved from a quiescent operating condition, such as during engine starting. In other embodiments, the electrical signal can provide an analog or digital measure on a substantially continuous basis of relative valve position or degree of valve opening. In any event, based on the instant disclosure, it will now be appreciated that hydraulic and mechanical signal generating means of various configurations can be used in appropriate circumstances.

In accordance with the invention, the signal which is indicative of regulator valve position is combined with a signal indicating engine operating conditions for that valve position, and processing means determines from the nature of those two input signals whether the engine fuel delivery system meets predetermined operating specifications. It will now be appreciated that the processing system, in its preferred form, does more than simply determine whether there is sufficient capacity at the conditions existing at the time the input signals were measured, but instead relates those measured conditions to the predetermined operating specifications which usually relate to conditions other than those at which the engine is operating. For example, it is preferred to relate the preferred operating specifications to the ability of the fuel delivery system to meet worst case engine operating demands, such as those existing for a windmill start. As a result, the predetermined operating specifications are different from, and in most cases more stringent than, the conditions at which the engine was operating at the time the signals on which the control system operates were produced.

Figure 5:
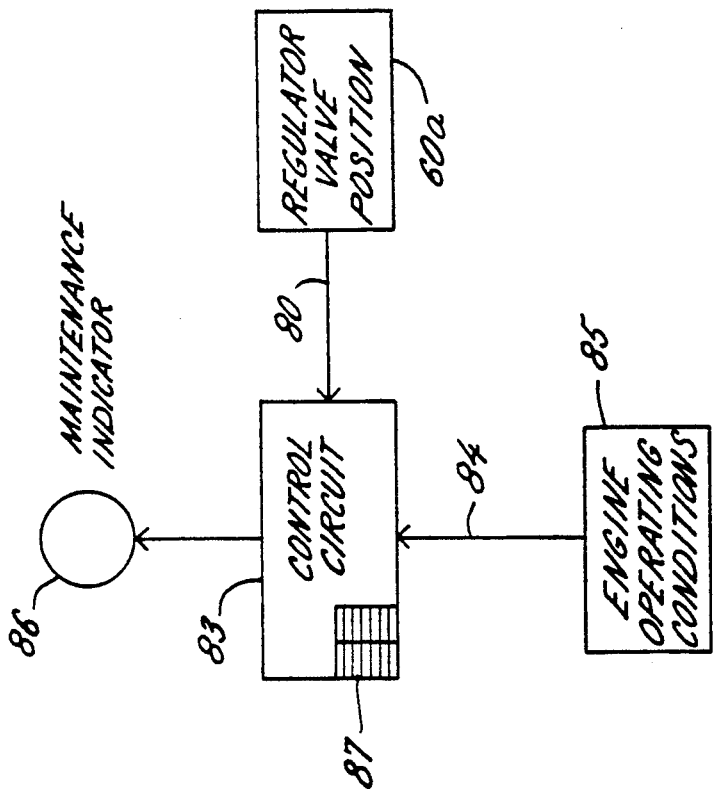
FIG. 5 is a block diagram illustrating the interrelationship between the control components of a system exemplifying the present invention.

FIG. 5 schematically illustrates the nature of such a control system. There is shown a control element 60a labeled regulating valve position, which is intended to encompass the regulating valve with position indicator, such as those described in connection with FIGS. 2-4 or to be described in connection with FIG. 6. An output signal from the valve position indicator is coupled on the line 80 to a control circuit 83. The signal on line 80 is preferably an electrical signal but, as noted above, a hydraulic or mechanical signal can also be used in appropriate circumstances. Furthermore, the signal can be in the nature of a one-condition monitor signal indicating that the valve has reached a predetermined position, or it can provide a more continuous measure of relative valve position. The control circuit has a second input on a line 84 from a block 85 labeled engine operating conditions. Most typically, the engine operating condition of interest is engine rotational speed, referred to for convenience as RPM. Since the fuel pump 26 (FIG. 1) is usually mechanically driven from the engine, when the operating condition signal 84 is engine RPM, it is a very direct measure of the operating speed of the fuel pump, as well as an indirect measure of the fuel needs of the engine. The engine operating condition signal source 85 can, and sometimes will, encompass other factors normally available in a complex computer controlled engine system, such as, for example, ambient temperature or altitude. The engine operating conditions signal generator 85 in its simplest configuration comprises an RPM sensor such as a digital encoder or tachometer positioned in the engine drive train. Alternatively, signals can be determined from existing sensors, or from control signals taken from the computer control which controls the aircraft and the avionics. When avionics-type signals are utilized as a source of engine operating condition signals, the estimate for engine operating conditions can be further improved since it is possible to take into consideration the altitude at which the craft is operating, whether the aircraft is cruising, climbing, descending, as well as to consider other factors relevant to the actual demands on the engine for the sensed condition of the fuel delivery system.

In any event, the two signals which are provided to the control circuit 83 provide two important elements of information: (1) the engine operating conditions which relate to both the fuel pump RPM and the fuel demands of the engine, and (2) the regulating valve position which is an indication of the excess capacity of the system to meet the conditions existing at the time of the measurement. The control circuit 83 includes means for processing the two input signals to produce an output signal indicative of the "health" of the fuel delivery system. FIG. 5 shows the indication as a simple illuminated indicator 86 such as an LED on a maintenance panel. The indicator can be located so that it is available only to maintenance personnel or, if desired, can be one of the many indicators in the pilot display on the flight deck of the aircraft.

The manner in which the control circuit 83 processes the two input signals to determine whether the fuel delivery system is within specifications can take several forms. It is preferred to sense the excess capacity of the engine at operating conditions nearest those at worst case, so as to get a most direct measure of the needed capacity. To that end, the system is operated to sense regulating valve position 60a during the engine starting on the ground. Thus, the signal on line 84 will indicate engine RPM during startup, and will cause the control circuit 83 to continue to sense engine RPM during startup until a signal is provided on line 80 to make note of the RPM at a particular point in startup and determine excess capacity based on that information.

More particularly, in the simplest and currently preferred practice of the invention, the system of FIG. 5 makes its determination of fuel system acceptability during engine startup. The regulator valve position element 60a provides a signal indicating that the regulator valve has made an initial move from a quiescent position during startup. By "initial move" is simply meant that the regulator valve has traveled to a predetermined position during the startup operation. Such predetermined position can be an initial move of the valve from a rest position as one example, or the movement of a valve to the point at which the bypass is just cracked, as another example. The positioning of port 70 in the FIG. 2 embodiment allows the sensing of valve position to provide a signal as to when the valve has reached that position. In any event, the fact that the valve position has been reached is signalled on line 80, and the corresponding RPM signal on line 84 is sensed at that time to determine the RPM during startup at which the valve initially moved to the predetermined position. The control circuit 83 then determines from those two elements of information whether the fuel delivery system is within specifications and whether it has adequate capacity to meet worst case system demands.

The control circuit 83, when it is implemented in its preferred form as a subroutine in a microprocessor based control, includes a table 87 relating operating RPM to regulating valve position. If the regulating valve position is within the limit specified in the table for the actual operating condition as sensed on the line 84, the control circuit 83 determines that the fuel delivery system capacity is adequate and does not illuminate the indicator 86. However, for a given engine operating condition indicated on line 84, when the control circuit 83 determines from the table 89 that the demanded regulating valve position specified in the table is not achieved by the actual regulating valve position as determined by the signal on line 80, the control circuit 83 produces an output signal to illuminate the indicator 86. The airline operator can then take appropriate corrective action.

It is also possible, of course, to continuously monitor the fuel delivery system capacity during normal operation of the aircraft. The control circuit 83 can make provision for such extended operation monitoring by extending the table 87 Thus, there will also be entries in the table 87 for engine idling RPM, and also for a number of operating levels expected in normal cruising. The corresponding regulating valve position entries are also stored in the table 87 relating to the cruising engine RPM values. When using the system of FIG. 5 to determine excess capacity at cruising, it is often useful to include additional information in the engine operating condition signal 84. For example, the fuel demands of the engine, while light at normal cruising, are even less at high altitude descent. Thus, engine RPM alone would provide an incomplete picture in such conditions, and additional information, such as air speed, altitude or the like may also be useful operating conditions needed to further refine the estimate of excess capacity at the actual engine operating condition.

Figure 6:
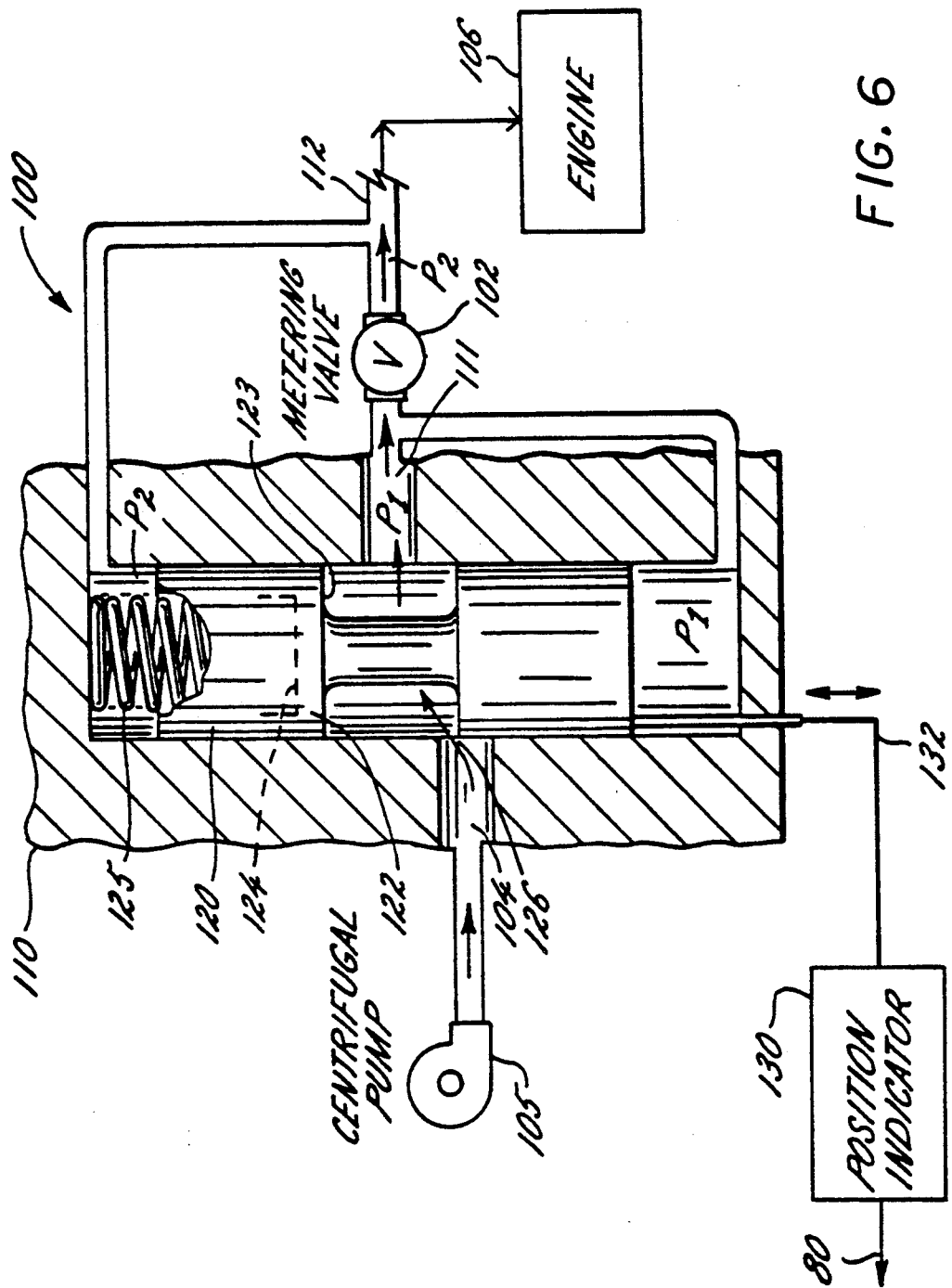
FIG. 6 is a diagrammatic view of another form of fuel delivery system for a gas turbine aircraft engine incorporating a monitoring system and exemplifying the present invention.

The regulating valves of FIGS. 1–4 have all been of the bypass type which, in effect, create a bypass passage in parallel with the metered engine branch of the fuel delivery system to divert excess flow from the metering branch in order to maintain the pressure substantially constant across the metering valve. While such systems find widespread use in aircraft, they are not the only type; other types of systems can, however, benefit from application of the present invention. One of such systems is illustrated in FIG. 6 which shows a portion of a fuel metering system for an aircraft gas turbine engine which utilizes a centrifugal pump for creating the high pressure fuel source. It is seen that the fuel delivery system 100 has a metering valve 102 connected to a high pressure source of fuel 104 and is adapted to meter fuel flow to the combustion chamber of a gas turbine engine 106. A regulating valve 110 is connected across the high pressure side 111 and low pressure side 112 of the metering valve to monitor and regulate the pressure drop $\Delta P$ across the metering valve 102. The high pressure fuel source 104 of the FIG. 6 embodiment includes a centrifugal pump 105 which has the characteristic of reduced flow rate at reduced efficiency as the output is throttled. Thus, in such a system, the bypass arrangement of the prior embodiments can be dispensed with, and the $\Delta P$ pressure drop across the metering valve can be stabilized by throttling flow between the centrifugal pump 105 and the metering valve. The regulator valve 110 acts to throttle such flow and in effect reduces the high pressure at the inlet side of the metering valve as it closes, or increases that pressure as it opens to controllably alter the flow rate from the centrifugal pump 105.

It is seen that the regulating valve 110 includes a spool 120 which controls flow through the valve. The piston member 122 of the spool 120 senses the pressure differential $\Delta P$ and, as can be seen, has the high pressure side $P_1$ ported to the lower face 123 thereof, and the low pressure side $P_2$ coupled to the upper face 124 thereof. A spring 125 establishes a normal bias condition. Whenever $\Delta P$ across the metering valve changes (as a result of opening or closing the metering valve, for example), the $\Delta P$ sensed across the piston 122 causes the spool 120 to rise or fall, thereby opening or closing a throttling port 126, which is the control element of the regulating valve 110.

As an example, when the metering valve 102 is further opened, $\Delta P$ decreases by virtue of $P_1$ decreasing with respect to $P_2$. That decrease in pressure is sensed across the piston 122, causing the spool 120 to move downwardly and further opening the throttling port 126 to increase flow from the centrifugal pump 105. That increased flow raises the pressure $P_1$ to ultimately result in a ΔP across the metering valve at the predetermined level. Similarly, if the metering valve 102 is further closed, ΔP increases, causing the spool 120 to rise in the regulating valve, further closing the throttling port 126 to reduce the flow from the centrifugal pump 105 and the ΔP across the metering valve. It will thus be appreciated that the position of spool 120 within the regulating valve 110 is a measure of excess delivery capacity of the fuel delivery system, insofar as additional capacity could be provided if the regulating valve were further opened beyond its then-set position should operating conditions demand.

In practicing the invention, indicator means 130 are connected by means of a linkage 132 to the spool 120 for indicating the degree of opening of the throttling port 126. As such, the position indicator 130 produces a signal on output line 80 which can be a measure of excess capacity of the fuel system when combined with signals relating to the actual operating conditions under which the throttling valve position is measured.

It will thus be appreciated that what has been provided is a system for producing information not readily available in aircraft engines heretofore. Simply utilizing a standard fuel delivery system which has a normal component includes a regulating valve for maintaining ΔP across the engine metering valve, the position of the regulating valve is monitored to create a first signal. That signal is interpreted along with a further signal indicating engine operating conditions at the time the first signal was taken in order to determine the excess capacity of the fuel delivery system at the sensed conditions, and determine from that whether the delivery system will be capable of meeting predetermined requirements such as worst case demand.

What is claimed is:

1. A gas turbine aircraft engine fuel delivery system with capacity monitor, said fuel delivery system comprising, in combination:
   a fuel supply and a pump for creating a high pressure fuel source,
   a metering valve for metering fuel from the high pressure source to the engine,
   a regulating valve for maintaining the pressure drop across the metering valve at a substantially constant level,
   indicator means for producing a first signal related to the position of the regulating valve,
   means for producing a second signal relating to engine operating conditions, and
   control circuit means responsive to the first and second signals for estimating the capacity of the fuel delivery system to meet predetermined operating specifications from the position of the regulating valve at the actual operating conditions for that regulating valve position.

2. The system as set forth in claim 1 wherein the indicator means comprises means for sensing flow in the regulating valve and producing the first signal in response thereto.

3. The system as set forth in claim 1 wherein the indicator means comprises means for sensing the degree of opening of the regulating valve and producing the first signal in response thereto.

4. The system as set forth in claim 1 wherein the indicator means comprises means for sensing initial movement of the regulating valve from a quiescent position.

5. The system as set forth in claim 1 wherein the means for producing a second signal comprises means for producing a signal relating to at least engine RPM.

6. The system as set forth in claim 1 wherein the predetermined operating specifications relate to a set of operating conditions for the engine other than the actual operating conditions at which the first and second signals are determined.

7. The system as set forth in claim 6 wherein the set of operating conditions are more stringent than the actual operating conditions at which the first and second signals are determined.

8. The system as set forth in claim 1 wherein the regulating valve is a bypass valve connected to divert high pressure fuel back to the supply, the indicator means serving to produce an indication of the quantity of bypass fluid flow.

9. The system as set forth in claim 1 wherein the regulating valve is a bypass valve having a pair of inlets connected across the metering valve, the bypass valve including means for controllably bypassing pressurized fuel from the high pressure source, and in which the regulating valve position indicates bypass flow and thereby the capacity of the fuel delivery system at the actual operating condition.

10. The system as set forth in claim 1 wherein the regulating valve is a throttling valve for controlling flow to the metering valve, and the indicator means produces the first signal relating to the degree of opening of the throttling valve.

11. The system as set forth in claim 1 wherein the regulating valve is a throttling valve connected for throttling the high pressure fuel source between the pump and the metering valve, the regulating valve having inlets connected for measuring the pressure differential across the metering valve, and means responsive to the pressure differential for throttling the flow from the high pressure source to the metering valve.

12. The system as set forth in claim 1 wherein the predetermined operating specifications relate to the minimum acceptable fuel flow to the engine at engine starting RPM.

13. The system as set forth in claim 12 wherein the control circuit includes table means relating a plurality of actual engine operating conditions to respective regulating valve positions at the associated engine operating condition estimated to produce the minimum acceptable flow at engine starting RPM.

14. The system as set forth in claim 1 wherein the second signal relates to actual engine RPM, and the control circuit comprises means for estimating from said first and second signals whether the capacity of the fuel delivery system is adequate to supply sufficient fuel at engine starting RPM to reliably start the engine.

15. The system as set forth in claim 1 wherein the indicator means comprises means for sensing initial movement of the regulating valve from a quiescent position during engine starting, and the second signal relates to the corresponding engine RPM at the time of initial regulating valve movement.

16. A method of monitoring the capacity of a gas turbine aircraft engine fuel delivery system in which the fuel system has a fuel supply, a pump for creating a high pressure fuel source, a metering valve for metering fuel from the high pressure source to the engine, and a regulating valve for maintaining a substantially constant pressure differential across the metering valve, the method comprising the steps of:

monitoring the position of the regulating valve as a measure of excess fuel system delivery capacity at actual engine operating conditions, producing a first signal related to the monitored position, producing a second signal indicative of actual engine operating conditions, and processing the first and second signals and estimating from the monitored regulating valve position at the corresponding actual engine operating conditions whether the fuel delivery system is capable of meeting predetermined operating specifications.

17. The method as set forth in claim 16 wherein the regulating valve is a bypass valve, and the monitoring step comprises detecting initial movement of the regulating valve from a quiescent position as a measure of excess fuel system delivery capacity.

18. The method as set forth in claim 16 wherein the regulating valve is a bypass valve and the monitoring step comprises monitoring the bypass flow through the bypass valve as the measure of excess fuel system delivery capacity.

19. The method as set forth in claim 16 wherein the regulating valve is a throttling valve and the step of monitoring comprises monitoring the degree of throttling by the throttling valve as the measure of the excess fuel system delivery capacity.

20. The method as set forth in claim 16 wherein the step of producing a second signal comprises producing a signal relating to at least engine operating RPM.

21. The method as set forth in claim 16 wherein the predetermined operating specifications relate to a set of operating conditions for the engine other than the actual operating conditions at which the first and second signals are produced.

22. The method as set forth in claim 21 wherein the set of operating conditions are more stringent than the actual operating conditions at which the first and second signals are produced.

23. The method as set forth in claim 16 wherein the predetermined operating specifications relate to the minimum acceptable fuel flow to the engine at engine starting RPM.

24. The method as set forth in claim 23 wherein the step of estimating comprises entering a table relating a plurality of actual engine operating conditions to respective regulating valve positions at the associated engine operating conditions estimated to produce minimum acceptable flow rate at engine starting RPM.

25. The method as set forth in claim 16 wherein the second signal relates to actual engine RPM, and the step of estimating comprises estimating from said first and second signals whether the capacity of the fuel delivery system is adequate to supply sufficient fuel at engine starting RPM to reliably start the engine.

26. The method as set forth in claim 16 wherein the regulating valve is a bypass valve, the monitoring step comprises detecting initial movement of the regulating valve from a quiescent position during engine starting, and the step of producing comprises producing the second signal as a measure of engine RPM at the time said initial movement was detected.

* * * * *